Nov. 30, 1965  H. DAVISON  3,220,333
DEFROSTING OF FROZEN FISH

Filed June 12, 1961  5 Sheets-Sheet 5

INVENTOR:
HAROLD DAVISON
BY
Mead, Browne, Schuyler + Beveridge,
Attorneys

United States Patent Office 3,220,333
Patented Nov. 30, 1965

3,220,333
DEFROSTING OF FROZEN FISH
Harold Davison, Hull, England, assignor to Junella Foods Limited, Hull, England, a British company
Filed June 12, 1961, Ser. No. 116,515
Claims priority, application Great Britain, June 24, 1960, 22,121/60
4 Claims. (Cl. 99—234)

This invention concerns the defrosting of frozen fish.

It is customary at the present time, in commercial fishing operations, to preserve the catch by deep-freezing it, often at temperatures of −20° F., with the advantage that, inter alia, extended voyages can be undertaken without risk of some of the catch undergoing quality deterioration through relatively long storage. Conveniently, the individual fish are frozen together in blocks, perhaps of, say, five or ten fish to each block, which facilitates storage and handling.

However, some difficulty is experienced in subsequently de-frosting such blocks of fish, since it has been found that in order to preserve such desirable qualities as flavour, the de-frosting process should be carried out as quickly as possible, once the fish is required for use. Thus, although it is possible to achieve de-frosting at normal ambient temperatures, not only does this require a period of some 24 hours to 48 hours to complete, but the flavour characteristics may suffer. For this reason, it has already been proposed to employ high-frequency heating for defrosting purposes, but the further difficulty is then encountered, that if the heating process is hastened to render it economic, having regard to the high initial cost and cost of operating high-frequency equipment, there is substantial danger of cooking the interior of the fish by the time the exterior thereof has unfrozen to a satisfactory extent.

According to the present invention, the fish is subjected to water spraying whilst exposed to a flow of warm air.

Preferably the warm air is passed through a substantially closed container through which the fish is also caused to move, the water spray being directed into the incoming warm air stream and carried along therein.

In this way, probably due to favourable heat transfer conditions created by the water spray between the fish and the circulating warm air, the time required for raising the temperature of the fish to, or close to, ambient temperature is of the order of six to eight hours.

The invention will be described further, by way of example with reference to the accompanying, generally diagrammatic drawings, in which.

Figure 1:
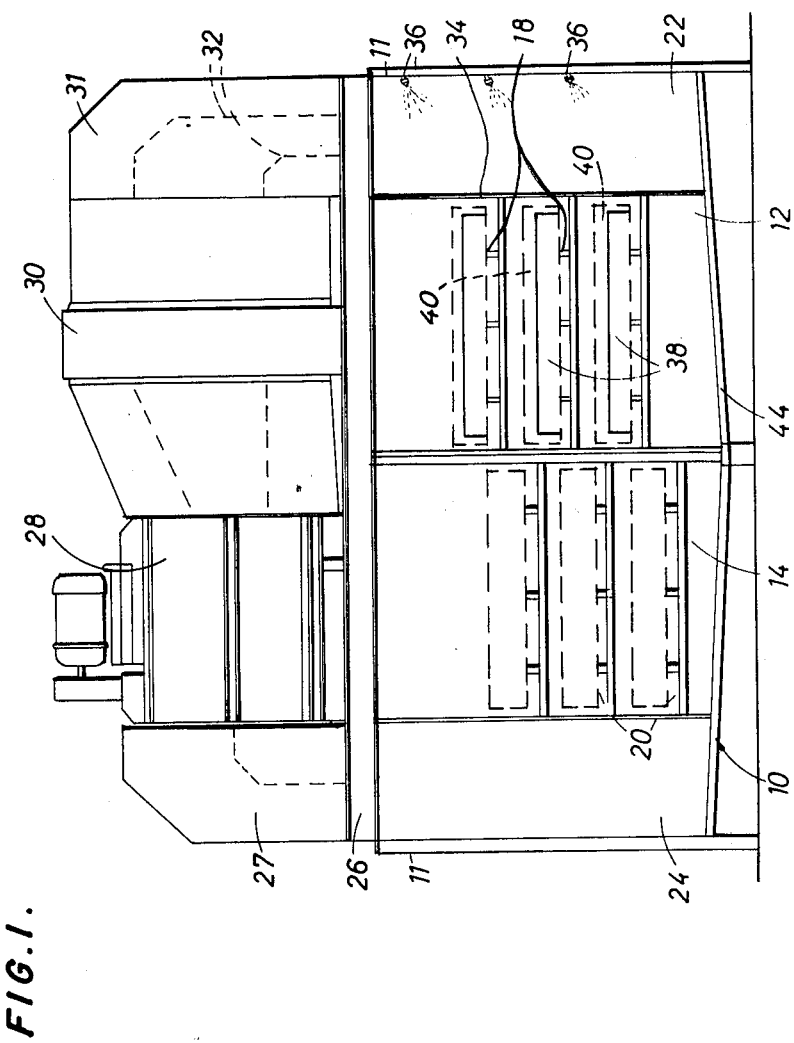
FIG. 1 is an end elevation of one fish de-frosting apparatus embodying the invention, with the end wall of the housing omitted for clarity and the doors in the end wall shown in phantom.

In the apparatus shown in the drawings, a housing generally designated 10 is internally divided into two mutually adjacent and intercommunicating compartments 12 and 14. Each of the compartments 12 and 14 has arranged therein a plurality of superimposed gravity roller conveyors 18 and 20 respectively extending throughout the length of the housing 10, and it will be noted that the conveyors 18 are given an inclination opposite to that of the conveyors 20.

Between the outer walls 11 of the housing 10 and the adjacent compartments 12 and 14, there are defined air ducts 22 and 24 respectively, and on the housing roof 26 are arranged electrically driven fans 28, the output of which passes through electric heaters 30 into an outlet duct 31 communicating with the duct 22, and the inlet sides of which are connected via a duct 27 to the duct 24. The fans 28 and heaters 30 enable warm air to be passed transversely across the housing 10 and around the conveyors 18 and 20 arranged therein, the air flow taking place in a direction from the compartment 12 to the compartment 14, and in order to secure a favourable distribution of the circulating air, the interior of the duct 31 is divided by air distributing baffles 32, and the duct 22 has air deflecting baffles 34 arranged therein to direct warm air flow to the conveyors 18 and 20. The attitudes of the baffles 34 relative to the conveyors may conveniently be adjustable within the duct 22. The outer wall 11 bounding the duct 22 also carries a number of mutually vertically spaced water spray nozzles 36 directed towards the conveyors 18 and adapted to disperse a fine water mist into the said duct.

In operation of the apparatus described above, blocks of deep frozen fish are loaded into trays 38 which are placed, by way of airtight doors 40, on to the conveyors 18 in the compartment 12. The loaded trays travel slowly through the compartment 12, consequent upon the periodic introduction of new trays on to the conveyors, whilst at the same time a vigorous circulation of warm air transversely across the compartment 12 and into the compartment 14 is created by the operation of the fans 28 and heaters 30. In addition, the current of warm air flowing through the air duct 22 entrains the fine water mist supplied by the spray nozzles 36, and this water is carried along and into contact with the fish moving down the conveyors 18 in the trays 38. The time taken for the trays to travel down the conveyors 18 through the length of the compartment 12 is to some extent dependent upon the nature of the fish and the degree to which it has been frozen. Typically, however, in de-frosting fish stored at −20° F., the travel time of the trays through the compartment 12 is about 3 hours. At the end of this time, the blocks of frozen fish are found to have commenced breaking up, and the trays arriving at the other end of the compartment 12 are lifted out off the conveyors 18, through airtight doors 42. These trays are then moved to the other side of the housing 10, to the airtight doors 42 giving access to the conveyors 20, and the contents of each tray 38 which has passed through the compartment 12 are inverted into another tray which is then placed on a conveyor 20 to pass through the housing 10 in the opposite direction, in the compartment 14. De-frosting of the already partly unfrozen fish is then completed by exposure to the warm air and water mist entering the compartment 14 from the compartment 12, although the temperature of the air and mist will naturally be somewhat lower in the former than in the latter compartment. The travel time of the trays 38 through the compartment 14 is again preferably regulable, but is typically of the order of 3 hours, at the end of which time the fish arriving at the discharge end of the compartment 14 is ready for sale and use.

The water produced in the compartments 12 and 14, both by thawing of the blocks of fish and by condensation of the water mist, is drained by a sloping floor 44 of the housing 10 into a central gulley 46 which passes it to a drainage sump 48.

It will, of course, be appreciated that control of the time taken for unfreezing the blocks of fish may be effected by varying the air delivery of the fans 28, the electrical consumption of the heaters 30, and the rate of water feed to the spray nozzles 36, the fan delivery and the heater consumption being the more important factors.

Figure 4:
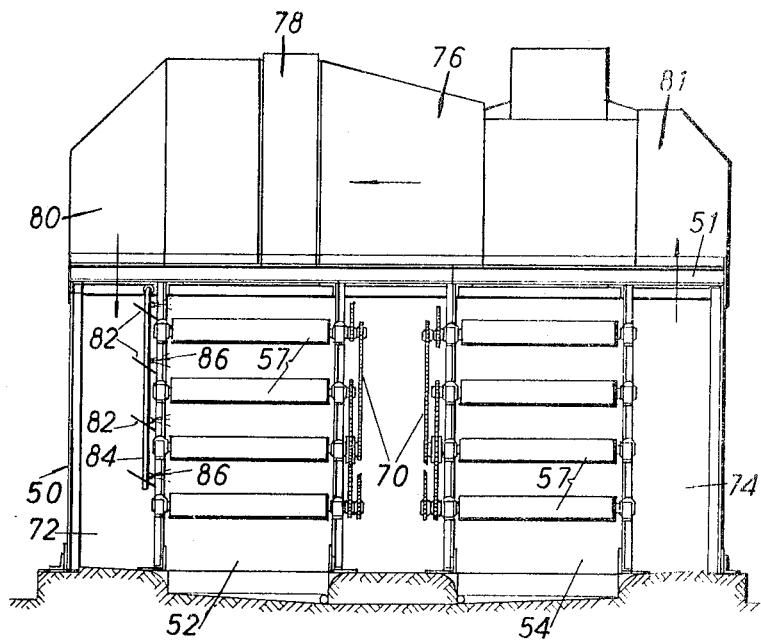
FIG. 4 is an end elevation of another embodiment of the invention, having the housing end wall removed for clarity.
Figure 5:
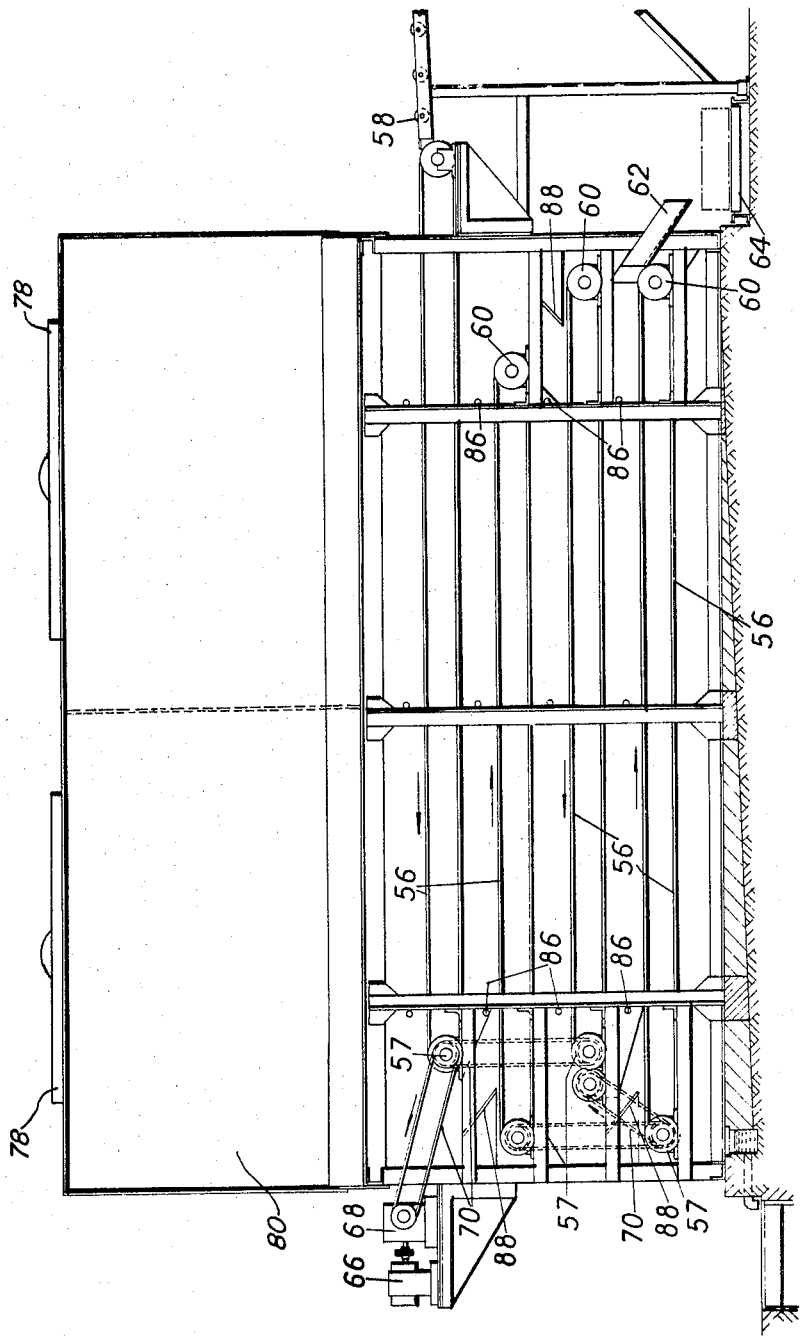
FIG. 5 is an elevation viewed from the left-hand side of FIG. 4, and with the housing side wall omitted for clarity.

Referring now to FIGS. 4 and 5 of the drawings, which show an embodiment of the invention employing driven conveyors, an internally divided housing generally designated 50 again has two mutually adjacent and intercommunicating compartments 52 and 54 extending substantially throughout its length. Within each compartment are arranged a plurality of driven conveyors 56 in superposed relation and passing over driving and return drums 57 and 60, with adjacent conveyors driven in opposite directions. The uppermost conveyor 56 in each instance projects from the housing 50 to receive incoming frozen fish from a feed conveyor 58, while the lowermost conveyor 56 has its return drum 60 adjoining a discharge chute 62 from which defrozen fish is passed to an output conveyor 64 external to the housing. The conveyors 56 are of metal mesh construction and are driven from an electric motor 66 and associated reduction gear 68 by means of chain and sprocket transmissions 70. As will be appreciated, the speed of the conveyors 56 may be determined in conventional manner by speed control of the motor 66 or by adjustment of the reduction gear 68. The ends of the housing 50 are substantially closed, and flexible flap means such as pivotal or rubber flaps (not shown) are provided to maintain closure at the fish inlet and outlet points and at the point of entry of the conveyor drive into the housing.

Figure 2:
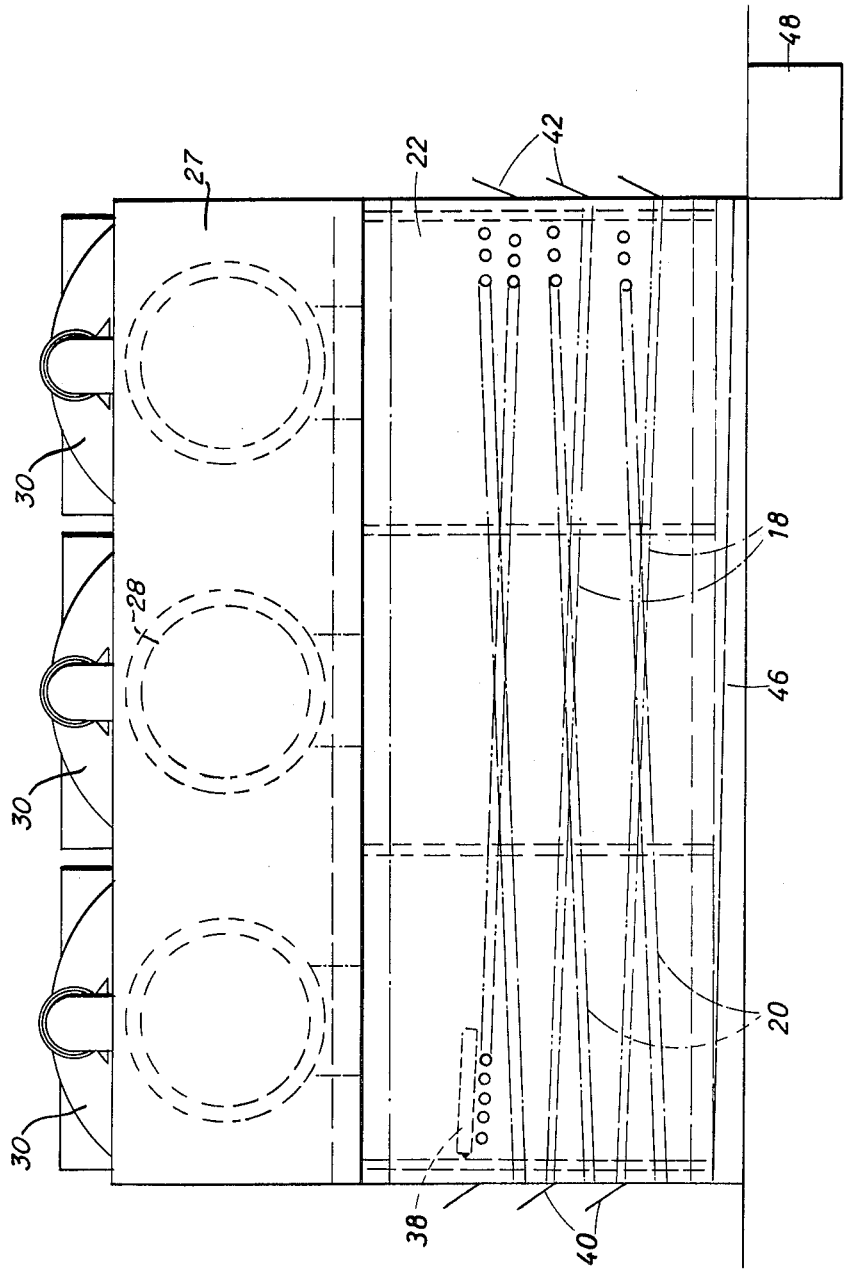
FIG. 2 is an elevation viewed from the left-hand side of FIG. 1.
Figure 3:
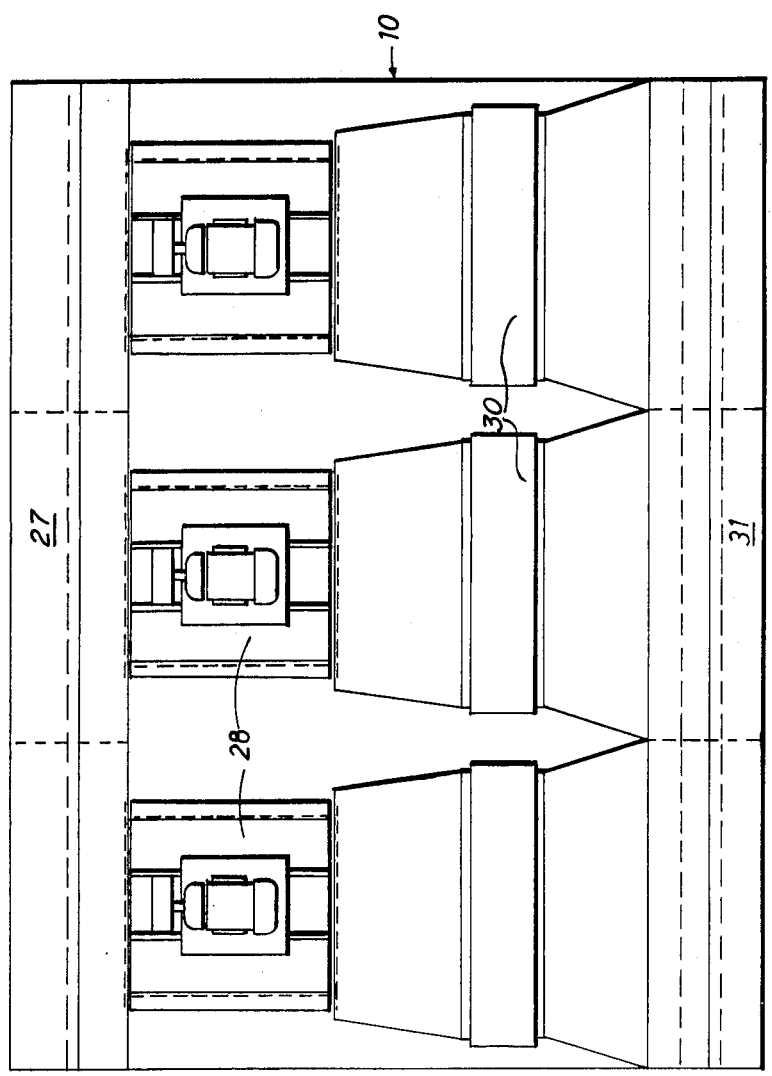
FIG. 3 is a plan view.

An air duct 72 is provided at the outer side of the compartment 52, and a similar air duct is provided at the outer side of the compartment 54. On the housing roof 51 are arranged electrically driven fans 76 and electric heaters 78, the output of the fans 76 passing through the heaters into an outlet duct 80 communicating with the duct 72. The fan inlets are connected to the air duct 74. By means of the fans and heaters, warm air may be passed transversely across the housing 50 and around the conveyors 56, with the air flow taking place in a direction from the compartment 52 to the compartment 54, and as in the embodiment of FIGS. 1 to 3, air distributing baffles (not shown) may be provided in the duct 80 and deflecting baffles 82 may be arranged in the duct 72 to obtain the optimum circulation of the warm air. Water spray nozzles 86 carried by water supply pipes 84 in the duct 72 are also provided for dispersing a fine water mist into the duct, the water mist being entrained in the warm air flow.

The operation of this embodiment of the invention is generally similar to that already described, except that the frozen blocks of fish are placed by the feed conveyor 58 directly on to the uppermost conveyor 56, and are not carried in trays. The frozen blocks are moved through the housing 50 by the upper conveyor, at a speed determined by the motor 66 and/or the reduction gear 68, and at the end of the upper conveyor, each block is tipped with its leading end downwards on to a downwardly inclined chute or feed plate 88 arranged adjacent and just below the conveyor driving drum 57. The combined effect of this downward tipping action and the inclination of the plate 88 is to invert the still frozen block of fish, which is then passed by the plate 88 on to the next lower conveyor 56 which is, of course, driven in a direction opposite to that of its predecessor. In this way, the block is passed through the housing 50, being transferred from conveyor to conveyor by similar feed plates 88, and by experience, the several variable factors such as the air temperature and rate of air flow, the water feed through the sprays 86 and the conveyor speed may be appropriately adjusted to cause the fish to be completely and individually unfrozen by the time it is discharged through the outlet 62. As already indicated, the time taken to achieve this is typically of the order of three hours, and with the conveyor speed selected accordingly, separate batches of frozen fish may be dealt with in each of the two compartments 52 and 54, thus achieving a higher throughput than in the case of the embodiment of FIGS. 1 to 3. It will be noted that provision is also made in FIGS. 4 and 5 for recovering the water draining from the housing 50, by passing it through strainers 90 into a sump 92 from which it may be pump recirculated to the sprays 86. In this way, an advantageous heat economy can be effected.

Various modifications may be made within the scope of the invention. For example, although the above-described motion of the trays 38 through the housing 10 is of a substantially horizontal nature, such motion may be carried out in substantially vertical, upward and downward paths, or a combination of horizontal and vertical paths may be employed. Again, instead of the air current from the fans 28 traversing the housing 10 across the conveyors 18 and 20, longitudinal air flow in one direction along the compartment 12 and in the reverse direction along the compartment 14 may be employed, by providing an airtight division between the said compartments.

I claim:

1. Apparatus for defrosting frozen fish, comprising a substantially closed housing, conveyor means in said housing for moving frozen fish in a predetermined path through said housing, continuously operable fan means communicating with said housing for maintaining a flow of air through said housing over said conveyor means and transversely of the direction of motion thereof, heater means in the air flow path for warming said air, and continuously operable water spray means in said air flow path within said housing adjacent the entry of said flow path into said housing, and co-operating with the air flowing transversely across said conveyors to envelope said conveyors in a sustained and turbulent aqueous atmosphere.

2. Apparatus for defrosting frozen fish, comprising a closed air duct system including continuously operable fan means and heater means for maintaining a circulation of warm air around said system, a substantially closed housing interposed in series in said air duct system and having opposed regions connected to said system whereby said air is caused to traverse the interior of said housing, conveyor means in said housing for moving frozen fish in a predetermined path therethrough and transversely through the air flow therein, and water spray means in said housing at the upstream region of said air flow and co-operating with said air flow to maintain a turbulent aqueous atmosphere enveloping said conveyors.

3. Apparatus for defrosting frozen fish, comprising a substantially closed housing having its interior divided into a plurality of adjoining compartments, a plurality of generally horizontally arranged conveyors in superposed relation in each said compartment, fan means carried by said housing externally thereof, an air inlet duct including air heater means connecting the delivery side of said fan means with said housing at one side of said conveyors, an air return duct connecting the opposite side of said housing with the intake side of said fan means, and a plurality of groups of vertically distributed water spray nozzles in said air inlet duct adjacent said conveyors and spaced lengthwise along said housing for co-operation with said air inlet duct in maintaining a turbulent aqueous atmosphere enveloping said conveyors.

4. Apparatus as claimed in claim 3, in which the conveyors are driven endless conveyors with adjacent conveyors being driven in opposite directions, the end of each conveyor terminating above and short of the beginning of the next succeeding conveyor therebelow, and wherein there is provided adjacent but spaced from the end of each conveyor, a feed plate which is downwardly inclined in the direction of travel of said next succeeding conveyor and which acts to direct fish discharged from each conveyor on to said next succeeding conveyor.

References Cited by the Examiner

UNITED STATES PATENTS

| | | | |
|---|---|---|---|
| 1,015,786 | 1/1912 | Coyle | 34—203 |
| 1,059,597 | 4/1913 | Clair | 99—194 |
| 1,850,031 | 3/1932 | Rayson | 99—234 |
| 2,130,237 | 9/1938 | Hormel | 99—194 |
| 2,128,728 | 8/1938 | Hormel | 99—234 |
| 2,331,184 | 10/1943 | Goldthwait | 99—234 |
| 2,339,507 | 1/1944 | Nagy | 99—269 |
| 2,418,683 | 4/1947 | Wilson | 34—203 |
| 2,701,205 | 2/1955 | Ekelund | 99—361 |
| 2,767,668 | 10/1956 | Spooner | 107—55 |

FOREIGN PATENTS 818,391    8/1959    Great Britain.

CHARLES A. WILLMUTH, *Primary Examiner.*

HYMAN LORD, JEROME SCHNALL, ROBERT E. PULFREY, *Examiners.*